(No Model.) 2 Sheets—Sheet 1.
J. P. BURNHAM.
MACHINE FOR MANUFACTURING FLOORING.
No. 547,481. Patented Oct. 8, 1895.
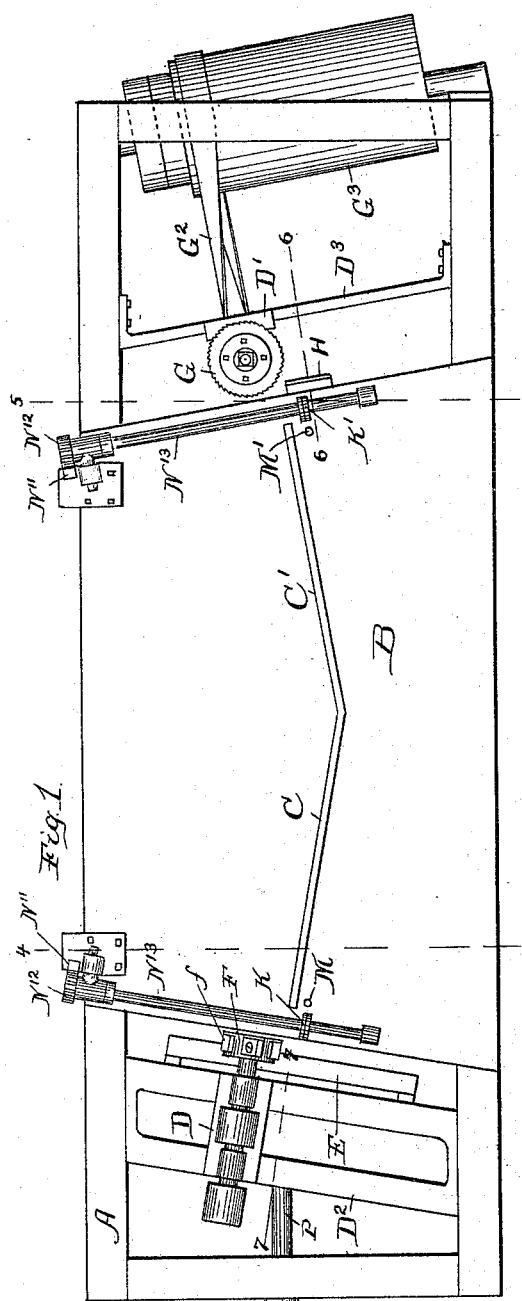
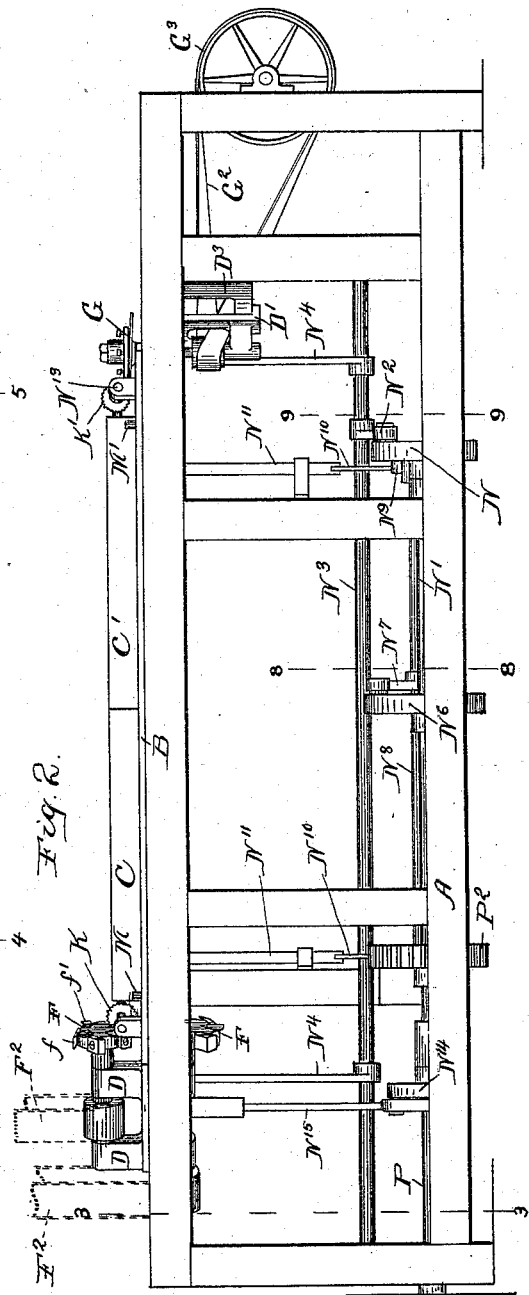
Witnesses:
Lew. E. Curtis
Emma Hack
Inventor:
John P. Burnham
By Munday, Evarts & Adcock
his Attorneys.

(No Model.) 2 Sheets—Sheet 2.
J. P. BURNHAM.
MACHINE FOR MANUFACTURING FLOORING.
No. 547,481. Patented Oct. 8, 1895.
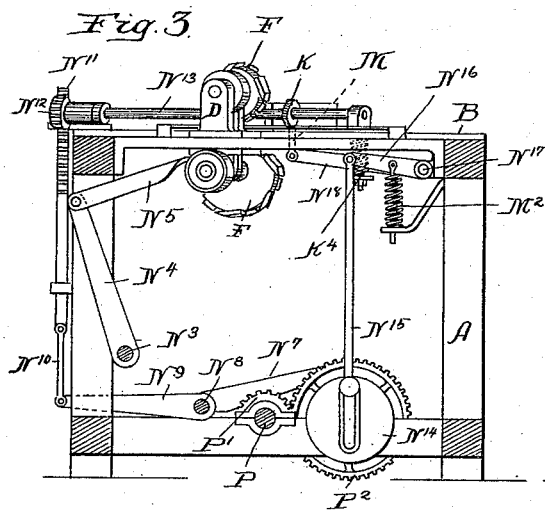
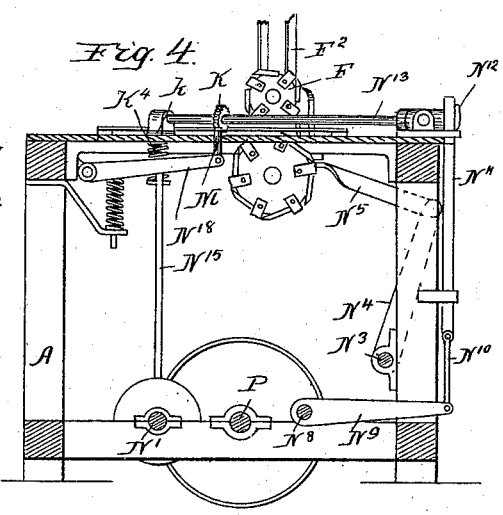
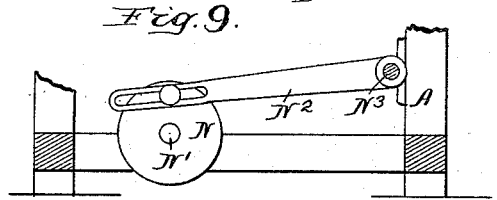
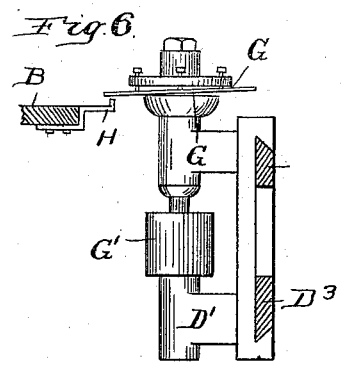
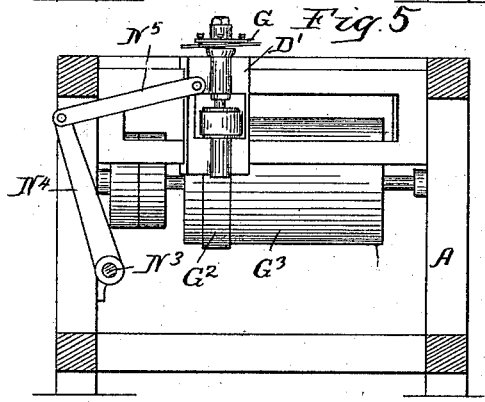
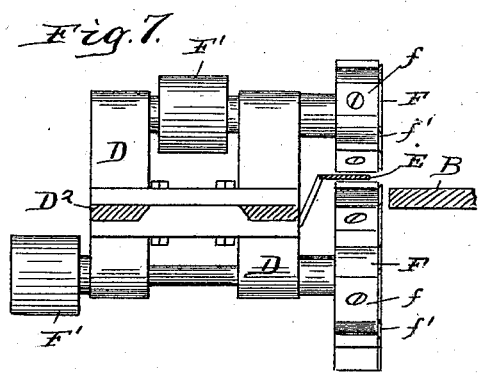
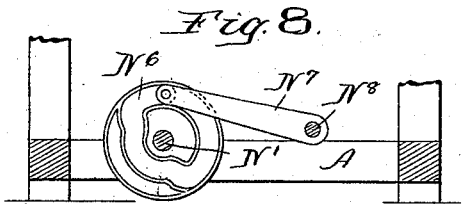
Witnesses:
Geo. E. Curtis
Emma Hack
Inventor:
John P. Burnham
By Munday, Evarts & Adcock
His Attorneys.

UNITED STATES PATENT OFFICE.

JOHN P. BURNHAM, OF CHICAGO, ILLINOIS, ASSIGNOR TO THOMAS WILCE, OF SAME PLACE.

MACHINE FOR MANUFACTURING FLOORING.

SPECIFICATION forming part of Letters Patent No. 547,481, dated October 8, 1895.

Application filed October 6, 1893. Serial No. 487,350. (No model.)

*To all whom it may concern:*

Be it known that I, JOHN P. BURNHAM, a citizen of the United States, residing in Chicago, in the county of Cook and State of Illinois, have invented a new and useful Improvement in Machines for Manufacturing Flooring, of which the following is a specification.

My invention relates to machines for matching or tonguing and grooving flooring.

Heretofore matching or tonguing-and-grooving machines have been made which operate to form interfitting tongues and grooves upon the two side edges of flooring strips or boards, the machine operating to make the flooring strips or boards of equal width and to form the tongues or grooves in the direction of the grain or fiber of the wood.

The object of my invention is to provide a machine for forming interfitting tongues and grooves upon the two end edges of flooring strips or boards, the boards necessarily varying in length and being often of comparatively great length, the tongues and grooves being formed across the grain or fiber of the wood. I have devised a machine by means of which this work may be performed accurately, rapidly, and cheaply; and my invention consists in this machine or in the novel combinations of parts or devices composing this machine— that is to say, my invention consists, primarily, in a table or support furnished with a guide for the side edge of the piece of flooring to fit against two transversely-reciprocating slides, one at each end of said guide, a pair of rotary cutter-heads mounted upon one of said reciprocating slides for forming the tongue across the grain at one end of the flooring-strip, a rotary cutter-head or saw mounted upon the other of said slides for forming a groove in the opposite end of the flooring strip or board across the grain of the wood, and a pair of stops, one at each end, for first one end of the board and then the other to abut against while the tongue and groove are being formed at or on its opposite ends.

It further consists, in connection with these parts, of a clamp or clamps for holding the board down firmly upon the table while being operated upon, one of these clamps being preferably located at or near each end of the table, so as to firmly hold the end of the board being operated upon.

It further consists, in connection with the above-named parts, in making the clamp in the form of a feed-roller, so that the clamps may also serve the function of feeding or pushing the board lengthwise into position against the end stop, first at one end for the first operation and then at the other end for the second operation.

It also consists, in connection with these parts, in providing the feed-table with a pair of supplemental movable or withdrawable stops, one near each end of the table, against which the operator may place the end of the board preparatory to its being pushed into the bite of the feed-roller upon the withdrawal of this supplementary stop, thus insuring the presentation of the board to the feed-roller at the proper time and the proper action of the feed-roller in feeding the board forward against the stop which governs the position of the board in respect to the tonguing-and-grooving devices.

It further consists, in connection with these parts, in arranging or mounting the reciprocating slides in guides or ways extending at a slight angle across the table, so that the two parts or sections of the guide may be arranged at an angle to each other, so that while one end of the board is being operated upon the other slide and cutter will not be in the way of the other end of the board.

In the accompanying drawings, which form a part of this specification, and in which similar letters of reference indicate like parts throughout all the views, Figure 1 is a plan view of a machine embodying my invention. Fig. 2 is a front side elevation. Fig. 3 is a section on line 3 3 of Fig. 2. Figs. 4 and 5 are sections on lines 4 4 and 5 5, respectively, of Fig. 1. Fig. 6 is a detail vertical section on line 6 6 of Fig. 1. Fig. 7 is a vertical section on line 7 7 of Fig. 1, and Figs. 8 and 9 are detail sections on lines 8 8 and 9 9 of Fig. 2.

In said drawings, A represents the frame of the machine, which may be of any suitable construction.

B is the table upon which the flooring boards or strips are supported while being operated upon. C C' are the guides on this table for the side edge of the flooring board or strip to abut against while being operated upon at either end. The two parts or sections C C' of the guide are arranged, preferably, at a slight angle to each other, so that when the board is being operated upon at one end and fitting, for example, against the guide C the opposite end of the board will clear the reciprocating slide and cutter and devices at the opposite end of the table.

D and D' are the transverse reciprocating slides, one at each end of the table, the same being adapted to reciprocate transversely across the table in suitable guides or ways $D^2$ $D^3$ on the table. The guideways $D^2$ $D^3$ are preferably arranged at a slight angle, the same being of course at right angles to the work-guides C C' on the table.

F F are a pair of rotary cutter-heads mounted upon the reciprocating slide D, the same having horizontal shafts, so that these heads rotate in vertical planes. Each of these cutter-heads is furnished with a series of peripheral knives $f$ and vertical or radial knives $f'$.

E is the stop, preferably secured to the stationary frame of the machine, against which the end of the board abuts while being operated upon by the heads F F, which together form the tongue upon the end of the board. The stop E is located between the cutter-heads F F.

G is a horizontally-revolving cutter or saw, preferably a wabble-saw, mounted upon the other reciprocating slide D', the purpose of which is to form the groove in the opposite end of the flooring board or strip.

H is the stop, preferably fixed to the frame of the machine, against which the end of the board abuts while being operated upon by the grooving-saw G.

The clamps K and K', which serve to hold first one end of the board and then the other down firmly in position upon the table while each end is in turn being operated upon, may be of any suitable construction adapted to perform this function of clamping or holding the board down firmly in place; but I prefer, as an additional or further improvement, to make these clamps or holding devices in the form of feed-rollers, as illustrated in the drawings, so that they may also perform the further or additional function of feeding the flooring strip or board against the stops E and H.

M and M' are the supplemental movable or withdrawable stops, against which the operator places the end of the board preparatory to its being pushed forward into the bite of the feed-rollers K K'. The feed-rollers are rotated at intervals to feed the strip forward against the stop E or H and again backward to discharge the board. The supplemental movable stops M M' are withdrawn just before the feed-rollers K K' begin to revolve in the direction to feed the board forward, so that the operator by simply pressing the board against this automatically-withdrawable supplemental stop pushes the board into the bite of the feed-roller the instant the supplemental stop is withdrawn, thus insuring the feeding of the board forward the proper distance against the stop E or H by the action of the automatic feed-rollers K or K'.

The slides D D' are automatically reciprocated, as required, by means of a crank N on the main cam-shaft N', operating a slotted arm or lever $N^2$, fixed to a rock-shaft $N^3$, to which is secured a pair of arms or levers $N^4$, connected by links $N^5$ with the cross heads or slides D D'. The joints of these links $N^5$ are of course made loose enough to prevent binding by reason of the inclined movement of the slides D D', or the links $N^5$ may have additional joints.

The feed-rollers K K' are intermittently turned backward and forward, as required, to feed the stock in and out by means of a cam $N^6$ on the cam-shaft N', actuating an arm or lever $N^7$, secured to a rock-shaft $N^8$, having a pair of arms or levers $N^9$ $N^9$, connected by links $N^{10}$ $N^{10}$ with racks $N^{11}$ $N^{11}$, which engage pinions $N^{12}$ $N^{12}$ on the shafts $N^{13}$ $N^{13}$ of the feed-rollers K K'.

The supplemental withdrawable stops M M' are intermittently withdrawn at intervals, as required, by means of a crank $N^{14}$ on the cam-shaft N', which actuates a slotted link $N^{15}$, connected at its upper end to an arm $N^{16}$ on the rock-shaft $N^{17}$, having a pair of arms $N^{18}$, to which the stops M M' are pivoted. These stops M M' are held in position by a spring $M^2$, except when withdrawn by the action of the cam before described. These spring-actuated stops thus prevent a board being pushed forward into the bite of the feed-rollers except at the proper time. Motion is communicated to the rotary cutters F and G by means of belts engaging the pulleys F' G' on the shafts of these cutters.

P is the drive-shaft, from which motion is communicated to the cam-shaft through the reducing-gears P' $P^2$.

The belts $F^2$ $F^2$, which communicate motion to the cutters F F, mounted on reciprocating slide D, should extend up vertically above the machine, as indicated in Figs. 2 and 3, so as to accommodate the transverse travel of the slide D. The travel of the other slide D' is provided for by a long pulley $G^3$, on which the belt $G^2$ may travel.

The shafts of the feed-rollers K K' are mounted in boxes provided with spring $K^4$ to exert the requisite pressure upon the board being fed. These boxes are also made vertically adjustable to accommodate different thicknesses of stocks by inserting washers or liners $k$ between the box and the bed-plate.

The flooring thus operated upon by the machine and furnished with tongues and grooves on its ends may be of any thickness or width desired.

I claim—

1. In a machine for forming tongues and grooves on the opposite ends of flooring boards or strips, the combination with a table furnished with guides for the side edge of the flooring strips to fit against, of two transversely reciprocating slides or cross heads, a horizontally revolving tool or saw mounted on one of said slides for forming the groove at one end of the flooring board, a pair of vertically revolving cutter heads mounted upon the other of said slides for forming the tongue on the opposite end of the board, a stop between said revolving cutter heads for the end of the board to abut against while being operated upon by said cutter heads, a second stop for the opposite end of the board to abut against while being operated upon by said grooving tool or saw, two rollers one near each end of said table for clamping or holding the board in position and feeding it forward against said stops, a pair of supplemental movable or withdrawable stops for holding the board in position to enter the feed rollers, mechanism for operating said reciprocating slides, mechanism for operating said feed rollers and mechanism for operating said movable supplemental stops, substantially as specified.

2. The combination with a table furnished with two guides arranged at an angle to each other of two reciprocating slides mounted in guide ways at right angles to said guides, a groove forming device mounted upon one of said slides, a tongue forming device mounted upon the other of said slides stops for the ends of the board to abut against while being operated upon, and clamps for holding the board in position on the table, said clamps being made in the form of feed rollers and serving also to feed the board against said stops, substantially as specified.

3. The combination with a table furnished with two guides arranged at an angle to each other of two reciprocating slides mounted in guide ways at right angles to said guides, a groove forming device mounted upon one of said slides, a tongue forming device mounted upon the other of said slides stops for the ends of the board to abut against while being operated upon, clamps for holding the board in position on the table, said clamps being made in the form of feed rollers and serving also to feed the board against said stops, and supplemental movable or withdrawable stops to temporarily arrest the board in position to enter said feed roller clamps, substantially as specified.

4. The machine for forming a tongue on one end and a groove at the other end of variable length flooring boards, comprising in combination the following instrumentalities: (1) a support for the board, (2) a rotary grooving mechanism rotating parallel with the plane of the board support, (3) a rotary tonguing mechanism rotating in a plane at right angles to the plane of the board support, (4) a guide for the side of the board extending from the tonguing mechanism at right angles to the line of the cut of said tonguing mechanism and being toward the grooving mechanism unobstructed and open, so that a board longer than the distance between the tonguing and the grooving mechanisms may be set against said guide, there being also a guide extending from the grooving mechanism in a line at right angles to the cut of the grooving mechanism and being toward the tonguing mechanism in similar manner unobstructed, said mechanisms for grooving and tonguing the board and said devices for supporting and guiding the board being relatively movable the one in respect to the other, substantially as specified.

5. The machine for forming a tongue on one end and a groove at the other end of variable length flooring boards, comprising in combination the following instrumentalities: (1) a support for the board, (2) a rotary grooving mechanism rotating parallel with the plane of the board support, (3) a rotary tonguing mechanism rotating in a plane at right angles to the plane of the board support, (4) a guide for the side of the board extending from the tonguing mechanism at right angles to the line of the cut of said tonguing mechanism and being toward the grooving mechanism unobstructed and open, so that a board longer than the distance between the tonguing and grooving mechanism may be set against said guide, said guide also extending from the grooving mechanism in a line at right angles to the cut of the grooving mechanism and being toward the tonguing mechanism in similar manner unobstructed, (5) a stop at the grooving mechanism for determining the depth of the groove, (6) and a stop at the tonguing mechanism for determining the length of the tongue, said grooving and tonguing mechanisms and said guide for the side of the board being relatively movable one in respect to the other substantially as specified.

6. The machine for forming a tongue on one end and a groove at the other end of variable length flooring boards, comprising in combination the following instrumentalities: (1) a support for the board, (2) a rotary grooving mechanism rotating parallel with the plane of the board support, (3) a rotary tonguing mechanism rotating in a plane at right angles to the plane of the board support, (4) a guide for the side of the board extending from the tonguing mechanism at right angles to the line of the cut of said tonguing mechanism and being toward the grooving mechanism unobstructed and open, so that a board longer than the distance between the tonguing and the grooving mechanisms may be set against said guide, there being also a guide extending from the grooving mechanism in a line at right angles to the cut of the grooving mechanism and being toward the tonguing mechanism in similar manner unobstructed, (5) and two independent clamps for holding the board, said mechanisms for grooving and tonguing the board and said devices for supporting and guiding the board being relatively movable the one in respect to the other substantially as specified.

7. The machine for forming a tongue on one end and a groove at the other end of variable length flooring boards, comprising in combination the following instrumentalities: (1) a support for the board, (2) a rotary grooving mechanism rotating parallel with the plane of the board support, (3) a rotary tonguing mechanism rotating in a plane at right angles to the plane of the board support, (4) a guide for the side of the board extending from the tonguing mechanism at right angles to the line of the cut of said tonguing mechanism and being toward the grooving mechanism unobstructed and open, so that a board longer than the distance between the tonguing and the grooving mechanisms may be set against said guide, said guide also extending from the grooving mechanism in a line at right angles to the cut of the grooving mechanism and being toward the tonguing mechanism in a similar manner unobstructed, (5) a stop at the grooving mechanism for determining the depth of the groove, (6) a stop at the tonguing mechanism for determining the length of the tongue, (7) and two independent clamps for holding the board, said grooving and tonguing mechanisms and said guide for the side of the board being relatively movable one in respect to the other substantially as specified.

8. The combination in a machine for tonguing and grooving the opposite ends of flooring boards, of a table provided with two guides thereon arranged at an obtuse angle to each other for the side of the board to fit against, of two transversely reciprocating slides mounted in guide ways one at right angles to each of said guides at the opposite ends thereof, a horizontal groove forming device mounted upon one of said slides for forming the horizontal groove in the one end of the board, and a tongue forming device mounted upon the other of said slides for forming a horizontal tongue on the opposite end of the board, substantially as specified.

9. In a machine for tonguing and grooving the ends of flooring boards, the combination with a table furnished with two guides arranged at an obtuse angle to each other for the side edge of the board to fit against while first one end and then the other end of the board are being operated upon, of two transversely reciprocating slides mounted on said table in two guide ways, one at right angles to each of said guides, a groove forming device mounted upon one of said slides for forming the groove in one end of the board and a tongue forming device mounted upon the other of said slides for forming the tongue at the opposite end of the board, and two stops, one for each end of the board to abut against alternately while being operated upon, substantially as specified.

10. In a machine for tonguing and grooving the ends of flooring boards, the combination with a table furnished with two guides arranged at an angle to each other for the side edge of the board to fit against while first one end and then the other end of the board are being operated upon, of two transversely reciprocating slides mounted on said table in two guide ways, one at right angles to each of said guides, a groove forming device mounted upon one of said slides for forming the groove in one end of the board and a tongue forming device mounted upon the other of said slides for forming the tongue at the opposite end of the board, and two stops, one for each end of the board to abut against alternately while being operated upon, and two clamps for holding the board in position on the table against said guides and stops, substantially as specified.

JOHN P. BURNHAM.

Witnesses:
   LEWIS E. CURTIS,
   EDMUND ADCOCK.